| (12) | United States Patent | (10) Patent No.: | US 10,974,494 B2 |
|---|---|---|---|
| | Porneala et al. | (45) Date of Patent: | Apr. 13, 2021 |

(54) LASER LIFT OFF SYSTEMS AND METHODS THAT OVERLAP IRRADIATION ZONES TO PROVIDE MULTIPLE PULSES OF LASER IRRADIATION PER LOCATION AT AN INTERFACE BETWEEN LAYERS TO BE SEPARATED

(71) Applicant: IPG Photonics Corporation, Oxford, MA (US)

(72) Inventors: Cristian Porneala, Woburn, MA (US); Mathew Hannon, Bedford, NH (US); Marco Mendes, Manchester, NH (US); Jeffrey P. Sercel, Hollis, NH (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 832 days.

(21) Appl. No.: 15/613,768

(22) Filed: Jun. 5, 2017

(65) Prior Publication Data

US 2017/0266946 A1 Sep. 21, 2017

Related U.S. Application Data

(60) Division of application No. 14/136,874, filed on Dec. 20, 2013, now Pat. No. 9,669,613, which is a (Continued)

(51) Int. Cl.
*B32B 43/00* (2006.01)
*B23K 26/50* (2014.01)
(Continued)

(52) U.S. Cl.
CPC .......... *B32B 43/006* (2013.01); *B23K 26/40* (2013.01); *B23K 26/50* (2015.10); (Continued)

(58) Field of Classification Search
None
See application file for complete search history.

(56) References Cited

U.S. PATENT DOCUMENTS 3,848,104 A * 11/1974 Locke .................. C21D 1/09
219/121.65
5,055,653 A 10/1991 Funami
(Continued)

FOREIGN PATENT DOCUMENTS

| CN | 1801459 A | 7/2006 |
|---|---|---|
| DE | 4234342 | 4/1994 |

(Continued)

OTHER PUBLICATIONS

Machine translation of JP-2008126283-A, Jan. 2020.*
(Continued)

*Primary Examiner* — Geoffrey S Evans
(74) *Attorney, Agent, or Firm* — Grossman, Tucker, Perreault & Pfleger, PLLC (57) ABSTRACT

Laser lift off systems and methods overlap irradiation zones to provide multiple pulses of laser irradiation per location at the interface between layers of material to be separated. To overlap irradiation zones, the laser lift off systems and methods provide stepwise relative movement between a pulsed laser beam and a workpiece. The laser irradiation may be provided by a non-homogeneous laser beam with a smooth spatial distribution of energy across the beam profile. The pulses of laser irradiation from the non-homogenous beam may irradiate the overlapping irradiation zones such that each of the locations at the interface is exposed to different portions of the non-homogeneous beam for each of the multiple pulses of the laser irradiation, thereby resulting in self-homogenization. Thus, the number of the multiple pulses of laser irradiation per location is generally sufficient (Continued)

to provide the self-homogenization and to separate the layers of material.

22 Claims, 5 Drawing Sheets

Related U.S. Application Data continuation-in-part of application No. 12/962,068, filed on Dec. 7, 2010, now Pat. No. 8,986,497.

(60) Provisional application No. 61/267,194, filed on Dec. 7, 2009.

(51) Int. Cl.
*B23K 26/40* (2014.01)
*B23K 101/40* (2006.01)
*B23K 103/00* (2006.01)

(52) U.S. Cl.
CPC ...... *B23K 2101/40* (2018.08); *B23K 2103/50* (2018.08); *Y10T 156/1158* (2015.01); *Y10T 156/1917* (2015.01)

(56) References Cited

U.S. PATENT DOCUMENTS

| | | | |
|---|---|---|---|
| 5,285,517 A | 2/1994 | Wu | |
| 6,208,458 B1 | 3/2001 | Galvanauskas | |
| 6,341,029 B1 | 1/2002 | Fillion | |
| 6,455,340 B1 | 9/2002 | Chua | |
| 6,531,678 B2 | 3/2003 | Yamamoto | |
| 6,540,952 B2 | 4/2003 | LaPoint | |
| 6,562,648 B1 | 5/2003 | Wong | |
| 6,617,261 B2 | 9/2003 | Wong et al. | |
| 6,674,045 B2 | 1/2004 | Iwase | |
| 7,105,857 B2 | 9/2006 | Nagahama et al. | |
| 7,112,456 B2 | 9/2006 | Park et al. | |
| 7,528,342 B2 | 5/2009 | Deshi | |
| 7,833,463 B1 | 11/2010 | Munson et al. | |
| 7,846,847 B2 | 12/2010 | Park et al. | |
| 8,198,113 B2 | 6/2012 | Nihei et al. | |
| 8,211,259 B2 | 7/2012 | Sato et al. | |
| 8,278,590 B2 | 10/2012 | Hall | |
| 8,313,961 B2 | 11/2012 | Ryu | |
| 2002/0006765 A1 | 1/2002 | Michel | |
| 2002/0146893 A1 | 10/2002 | Shimoda et al. | |
| 2002/0182889 A1 | 12/2002 | Solomon et al. | |
| 2003/0114017 A1 | 6/2003 | Wong et al. | |
| 2003/0219196 A1 | 11/2003 | Weng et al. | |
| 2004/0104202 A1 | 6/2004 | Downes | |
| 2005/0042845 A1 | 2/2005 | Urbanek | |
| 2005/0227455 A1 | 10/2005 | Park et al. | |
| 2005/0239270 A1 | 10/2005 | Fehrer et al. | |
| 2006/0003553 A1* | 1/2006 | Park | B23K 26/53 438/462 |
| 2006/0032470 A1 | 2/2006 | Ridderbusch | |
| 2006/0148186 A1 | 7/2006 | Lee et al. | |
| 2007/0199927 A1 | 8/2007 | Gu et al. | |
| 2007/0295952 A1 | 12/2007 | Jang et al. | |
| 2007/0298587 A1 | 12/2007 | Park | |
| 2008/0023691 A1 | 1/2008 | Jang et al. | |
| 2008/0182353 A1 | 7/2008 | Zimmerman et al. | |
| 2008/0242056 A1 | 10/2008 | Sercel | |
| 2008/0258165 A1 | 10/2008 | Zimmerman et al. | |
| 2008/0261341 A1 | 10/2008 | Zimmerman et al. | |
| 2009/0011614 A1 | 1/2009 | Bruland et al. | |
| 2009/0056513 A1 | 3/2009 | Baer | |
| 2009/0117707 A1 | 5/2009 | Shimomura et al. | |
| 2009/0185583 A1 | 7/2009 | Kuksenkov | |
| 2010/0055873 A1 | 3/2010 | Yan | |
| 2010/0060553 A1 | 3/2010 | Zimmerman | |
| 2010/0284428 A1 | 11/2010 | Furuya | |
| 2010/0294349 A1 | 11/2010 | Srinivasan | |
| 2011/0095107 A1 | 4/2011 | Clark | |
| 2011/0132549 A1* | 6/2011 | Sercel | B32B 38/10 156/712 |
| 2011/0201191 A1* | 8/2011 | Zhang | B23K 26/40 438/604 |
| 2011/0240616 A1* | 10/2011 | Osako | B23K 26/40 219/121.72 |
| 2012/0040484 A1 | 2/2012 | Fehrer et al. | |
| 2012/0064735 A1* | 3/2012 | Zhang | B23K 26/082 438/795 |
| 2013/0119031 A1 | 5/2013 | Matsuda | |
| 2014/0102643 A1 | 4/2014 | Pomeala et al. | |
| 2015/0239063 A1* | 8/2015 | Martinsen | B23K 26/0006 219/121.73 |

FOREIGN PATENT DOCUMENTS

| | | | |
|---|---|---|---|
| JP | 2002023099 | 1/2002 | |
| JP | 2003234542 | 8/2003 | |
| JP | 2003249453 | 9/2003 | |
| JP | 2007525016 | 8/2007 | |
| JP | 2008126283 A * | 6/2008 | |
| JP | 2009018335 | 1/2009 | |
| KR | 1020010101803 | 11/2001 | |
| KR | 10 2004 5612 | 1/2004 | |
| KR | 1020060004982 A | 1/2006 | |
| KR | 1020060059891 | 6/2006 | |
| KR | 1020070013288 A | 1/2007 | |
| KR | 1020070122120 | 12/2007 | |
| WO | WO-9743078 A1 * | 11/1997 | B23K 26/06 |
| WO | 2000047361 | 8/2000 | |
| WO | 03065420 | 8/2003 | |
| WO | 2004109764 | 12/2004 | |
| WO | 2005008740 | 1/2005 | |
| WO | 2007136183 | 11/2007 | |
| WO | 2007148866 | 12/2007 | |
| WO | 2008078952 | 7/2008 | |
| WO | 2010127621 | 11/2010 | |

OTHER PUBLICATIONS

U.S. Office Action dated Oct. 5, 2017, received in related U.S. Appl. No. 14/624,823, 10 pgs.
U.S. Office Action dated May 1, 2017, received in related U.S. Appl. No. 14/624,823, 10 pgs.
English language translation of Complaint for Invalidation of Korean Patent Registration No. 849779.
Kelly et al., Large Free-Standing GaN Substrates by Hydride Vapor Phase Epitaxy and Laser-Induced Liftoff, Japanese Journal of Applied Physics, vol. 38 p. L217, Feb. 1999.
Wong et al., Fabrication of thin-film InGan light-emitting diode membranes by laser lift-off, Applied Physics Letters, vol. 75 p. 1360, Jul. 1999.
Peyre, et. al., Laser shock processing of materials, physical processes involved and examples of applications, Journal of Laser Applications, vol. 8 pp. 135-141, Jun. 1996.
JPSAP Sercel Associates, Inc., "Price Quote Documents," dated Jan. 17, 2000, Nov. 7, 2002, Nov. 4, 2002, Jul. 24, 2003 and Mar. 18, 2003.
Notice of Preliminary Rejection with English translation dated Oct. 30, 2007, received in corresponding Korean Application No. 2006-7022455, 7 pgs.
Foreign office action dated Jul. 4, 2008 received in corresponding Chinese Application No. 200580015231.9, 6 pgs.
Chinese Office Action dated Nov. 13, 2009 issued in related Chinese Patent Application No. 20050015231.9.
Third Party Observation submitted in related Japanese Application No. 2007506445 dated Dec. 4, 2009 and reported by Japanese Patent Office on Jan. 12, 2010 (Japanese Notification 4 pages; English language translation of Third Party Observation 8 pages).
EPO Office Action dated Apr. 28, 2010 received in corresponding EPO Application No. 05 731 585.5, 6 pgs.
Third Party Observation dated Aug. 3, 2010 issued in Japanese Patent Application 2007-506445 and reported by the Japanese Patent Office Aug. 26, 2010; English language translation included, 6 pages.

(56) References Cited

OTHER PUBLICATIONS

Japanese Office Action dated Nov. 16, 2010 issued in Japanese Patent Application 2007-506445, 6 pages.
International Search Report and Written Opinion dated Feb. 8, 2011 in PCT International Patent Application No. PCT/US10/59243, 16 pages.
Anvik, Novel, Large-Area, High-Resolution, High-Throughput Lithography and Via Generation System Technology, downloaded from internet Nov. 11, 2009, www.anvik.com.technology.html, 6 pages.
Japanese office action with English translation dated Feb. 14, 2012, received in corresponding Japanese Patent Application No. 2007-506445, 5 pgs.
Chinese Office Action and English language summary dated Aug. 19, 2014, received in related Chinese Patent Application No. 201080055594.6, 14 pgs.
Korean Office Action dated Oct. 14, 2016, received in Korean Patent Application No. 10-2012-7017586, with English language translation attached, 20 pgs.

* cited by examiner

LASER LIFT OFF SYSTEMS AND METHODS THAT OVERLAP IRRADIATION ZONES TO PROVIDE MULTIPLE PULSES OF LASER IRRADIATION PER LOCATION AT AN INTERFACE BETWEEN LAYERS TO BE SEPARATED

CROSS-REFERENCE TO RELATED APPLICATION

The present application is a divisional of U.S. patent application Ser. No. 14/136,874 filed Dec. 20, 2013, now U.S. Pat. No. 9,669,613, which is a continuation-in-part of U.S. patent application Ser. No. 12/962,068 filed Dec. 7, 2010, now U.S. Pat. No. 8,986,497, which claims the benefit of U.S. Provisional Patent Application Ser. No. 61/267,194, filed Dec. 7, 2009, which is fully incorporated herein by reference.

TECHNICAL FIELD

The present invention relates to laser lift off systems and methods and more particularly, to laser lift off systems and methods that overlap irradiation zones to provide multiple pulses of laser irradiation per location at an interface between layers to be separated.

BACKGROUND INFORMATION

Laser lift off systems and methods are used to separate layers of material. One application in which laser lift off has been used advantageously is the separation of GaN layers from sapphire substrates when manufacturing light emitting diodes (LEDs). In spite of the advantages from UV-laser lift-off, GaN LED manufacturing has been limited due to poor productivity caused by low process yield. The low yield is due in part to high residual stresses in a GaN-sapphire wafer, resulting from a Metal-Organic Chemical Vapor Deposit (MOCVD) process.

Various laser lift off techniques have been developed in an attempt to separate layers, such as GaN and sapphire, more effectively. Examples of these laser lift off systems are disclosed, for example, in U.S. Pat. No. 7,202,141 and U.S. Patent Application Publication No. 2011/0132549, which are fully incorporated herein by reference. Despite the advantages of these techniques for many applications, challenges still exist when using laser lift off techniques because of localized problems, such as cracking, enhanced epi ablation, and local deviation in quality, which may impact overall yield. In some lift off processes, for example, higher exposures in certain areas may cause more material removal and higher pressures, which leads to epi cracking and eventually leads to degradation in the optical and/or electrical device.

BRIEF DESCRIPTION OF THE DRAWINGS

These and other features and advantages will be better understood by reading the following detailed description, taken together with the drawings wherein.

DETAILED DESCRIPTION

Laser lift off systems and methods, consistent with embodiments described herein, overlap irradiation zones to provide multiple pulses of laser irradiation per location at the interface between layers of material to be separated. To overlap irradiation zones, the laser lift off systems and methods provide stepwise relative movement between a pulsed laser beam and a workpiece. The laser irradiation may be provided by a non-homogeneous laser beam with a smooth spatial distribution of energy across the beam profile. The pulses of laser irradiation from the non-homogenous beam may irradiate the overlapping irradiation zones such that each of the locations at the interface is exposed to different portions of the non-homogeneous beam for each of the multiple pulses of the laser irradiation, thereby resulting in self-homogenization. Thus, the number of the multiple pulses of laser irradiation per location is generally sufficient to provide self-homogenization and to separate the layers of material.

The laser lift off systems and methods described herein may be used in a variety of applications for separating layers of material. One application is the separation of semiconductor layers, for example, by lifting off one or more epitaxial layers from a substrate of a semiconductor wafer. The laser lift off systems and methods described herein may be used, for example, to lift off or separate a GaN epi layer from a sapphire substrate of a semiconductor wafer. Other types of substrates and layers of material known to those skilled in the art may also be separated. Also, a sacrificial layer can be provided between the layers to be separated, for example, between the GaN and the sapphire. Any of the lift off systems and methods described herein can be applied to any highly absorbing material on a transparent carrier including, without limitation, a polymer material such as polyamide on transparent glass.

As used herein, "non-homogeneous" refers to a laser beam that does not have a uniform spatial distribution of energy across the profile of the laser beam. A non-homogeneous laser beam may have regions or portions of the beam that are homogeneous, such as the central region. As used herein, "smooth spatial distribution of energy" refers to a beam energy or intensity that decreases gradually along the beam profile, particularly toward one or more edges of the laser beam, instead of having sharply defined edges around the beam. One example of a "smooth spatial distribution of energy" is a beam energy that decreases from a central region of the beam toward edges of the beam (e.g., linearly or with a Gaussian profile), as described in greater detail below.

Figure 1:
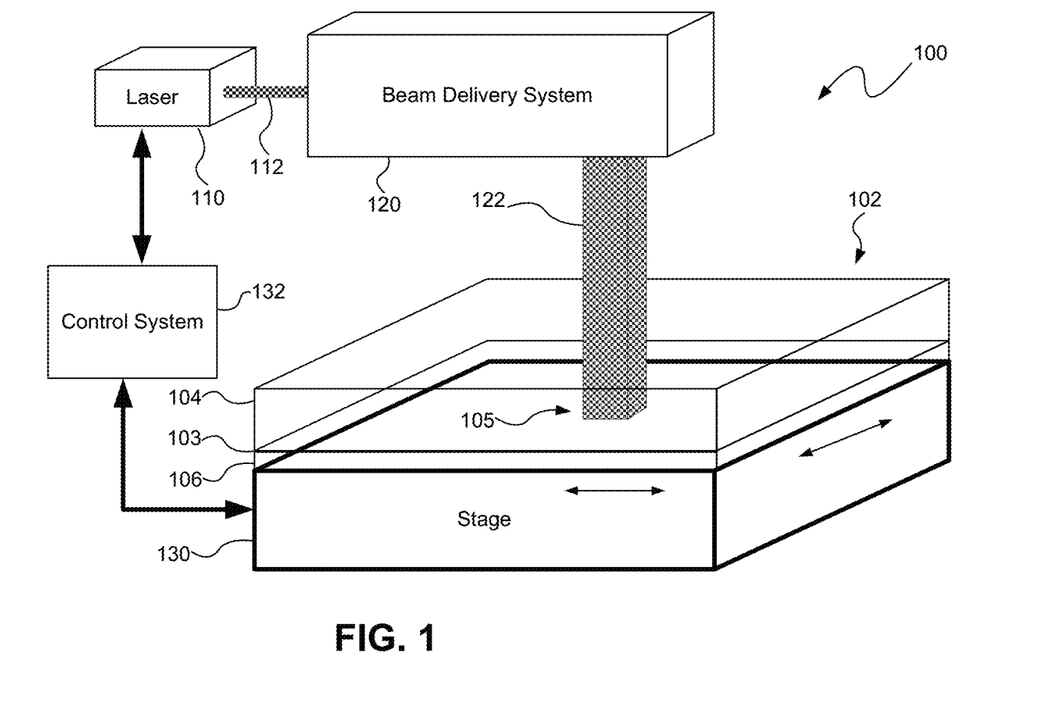
FIG. 1 is a schematic perspective view of a laser lift off system capable of moving a workpiece to overlap irradiation zones and provide multiple pulses of laser irradiation per location, consistent with embodiments of the present disclosure.

Referring to FIG. 1, one embodiment of a laser lift off system 100 is capable of moving a workpiece 102 to overlap laser irradiation zones 105 and provide multiple pulses of laser irradiation per location at the interface 103 between layers 104, 106 of the workpiece 102. The laser irradiation zones 105 are the zones or regions at the interface 103 that are irradiated by a pulse of laser irradiation and generally correspond to the beam spot produced by a laser beam at the interface 103, as described in greater detail below.

The laser lift off system 100 generally includes a laser source 110 for generating a raw laser beam 112 and a beam delivery system 120 for modifying the raw laser beam 112 and directing a modified laser beam 122 to the interface 103 between the layers 104, 106. The modified laser beam 122 may be a non-homogeneous laser beam with a smooth spatial distribution of energy, as described in greater detail below. In this embodiment, the laser lift off system 100 further includes a workpiece stage 130 for supporting and moving the workpiece 102 relative to the modified laser beam 122 to overlap the irradiation zones. The modified laser beam 122 forms the beam spot on the corresponding laser irradiation zone 105 at the interface 103 between the layers 104, 106. In this embodiment, a control system 132 is coupled to the laser source 110 and to the motion stage 130 to control the laser irradiations and the motion of the workpiece 102 relative to the modified laser beam 122 such that the laser irradiation zones overlap to provide multiple pulses of laser irradiation per location.

The laser source 110 is generally a pulsed laser and may include, without limitation, an excimer laser, a diode pumped solid state (DPSS) laser, or a fiber laser. In some embodiments, the laser source 110 may be capable of emitting pulses of laser irradiation with a duration between 1 and 200 nanoseconds. Excimer lasers, for example, may be capable of emitting pulses of laser irradiation with a duration between 20 to 30 ns and DPSS and fiber lasers may be capable of emitting pulses of laser irradiation with a duration up to 100 ns. The laser source 110 may also include an ultrafast laser capable of emitting ultrashort pulses having pulse durations less than 1 nanosecond (i.e., pulses with durations of femtoseconds or picoseconds) and more specifically less than 10 picoseconds. The laser source 110 may also be capable of producing different wavelengths (e.g., about 0.213 $\mu$m, 0.266 $\mu$m, 0.35 $\mu$m, 0.5 $\mu$m or 1 $\mu$m, or any wavelength at any increment between 157 nm and 2 microns) and at different pulse widths (e.g., ultrashort pulses less than about 10 ps). The laser source 110 may be capable of generating a single wavelength or multiple wavelengths. Excimer lasers, for example, may operate in a range between 157 nm and 351 nm depending upon the gas mixture and more particularly about 157, 193, 248, 308 and 351 nm. DPSS lasers, including fiber lasers, may operate at discrete wavelengths such as 266, 243, 355, 515, 532, 1030, 1064, 1070, and 1550 nm.

The laser irradiation parameters, such as the wavelength, pulse width, and energy density, may depend on the types of materials being separated. For example, a laser wavelength of 248 nm is suitable for separating GaN from sapphire because the photonic energy of 248 nm (5 eV) is between the bandgaps of GaN (3.4 eV) and sapphire (9.9 eV). Thus, the 248 nm radiation is better absorbed in GaN than in sapphire and the selective absorption allows the laser radiation to pass through the sapphire to ablate or debond the GaN resulting in separation. The energy density may be set such that the multiple pulses at each location will result in separation of the layers 104, 106 without causing cracking. The energy density may depend on the size and shape of the beam and the number of pulses per location, as discussed in greater detail below.

Those skilled in the art will recognize that other laser wavelengths may be used to separate other types of materials. For example, a buffer layer may be used between the sapphire substrate and the GaN layer(s) to facilitate epitaxial growth of the GaN. Examples of the buffer layer include a GaN buffer layer and an Aluminum Nitride (AlN) buffer layer. Where an AlN buffer layer is used, a laser at 193 nm may be used because the photonic energy of the 193 nm laser light (6.4 eV) is in between bandgaps of sapphire (9.9 eV) and AN (6.1 eV).

Figure 1A:
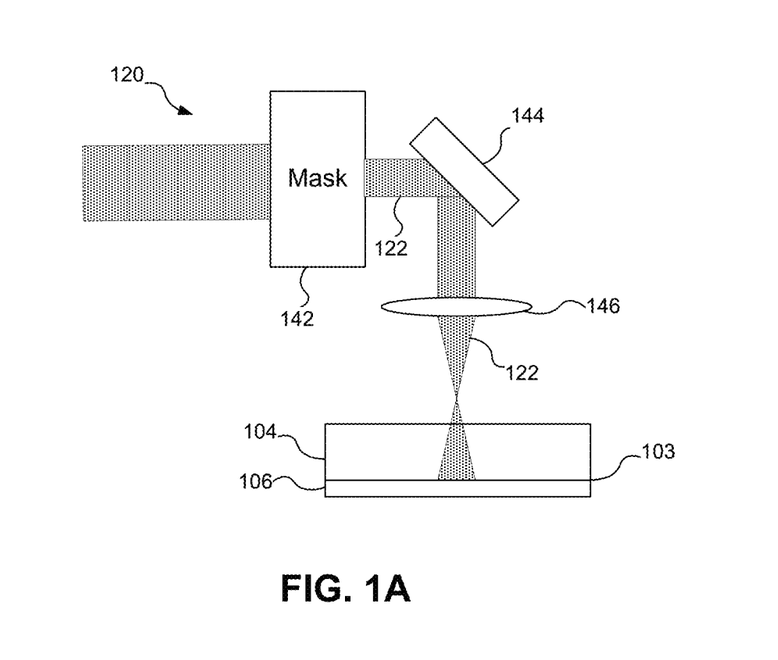
FIG. 1A is a schematic diagram of a beam delivery system that may be used in a laser lift off system, consistent with embodiments of the present disclosure.

FIG. 1A shows one embodiment of the beam delivery system 120 that may be used in laser lift off systems and methods described herein. The beam delivery system 120 includes a mask 142 for providing a modified laser beam 122, a reflector 144 for reflecting the modified laser beam 122, and a focal lens 146 for focusing the modified laser beam 122. The mask 142 may have an aperture that produces the desired beam shape (e.g., square or hexagonal) of the modified laser beam 122 when the raw laser beam 112 passes through the aperture. The beam delivery system 120 may also include a variable aperture mask capable of varying the size and/or shape of the modified laser beam 122.

The focal lens 146 may focus the modified laser beam 622 above the surface of a substrate 104 (as shown in FIG. 1A), at the surface of the substrate 104, or below the surface of the substrate 104. Focusing the modified laser beam 122 above the surface of the substrate 104 results in the out-of-focus beam at an interface 103 between the substrate 104 and the epi layer 106, which may be advantageous for processing patterned sapphire as described in greater detail below.

The beam delivery system 120 may also include beam shaping optics such as lenses (not shown) that change the shape and/or size of the modified laser beam 122. Beam shaping optics may be used, for example, to produce the desired beam shape of the modified laser beam 122 without using a mask. Beam shaping optics may also be capable of controlling the energy density of the beam spot, for example, as described in greater detail in U.S. Pat. No. 7,388,172, which is fully incorporated herein by reference. The beam delivery system 120 may thus be used to vary the energy density of the beam spot on the workpiece without having to adjust the laser power.

In embodiments using a non-homogeneous laser beam with a smooth spatial distribution of energy, the beam delivery system 120 may include various types of optical components to modify the raw laser beam 112 to produce the non-homogeneous, modified laser beam 122 with the smooth spatial distribution of energy. In at least one embodiment, the mask 142 may include a gray scale mask having a variable transmission with the highest transmission at a central region of the mask and a gradually decreasing transmission away from the center toward one or more of the edges, thereby resulting in a gradually decreasing beam intensity or energy toward one or more edges. In another example, the beam delivery system 120 may include optics to defocus the beam toward the edges of the beam. In a further example, beam delivery system 120 may include a homogenizer that is adjusted such that the laser beam becomes less homogenous toward the edges of the beam.

Techniques used to provide the non-homogeneous laser beam with a smooth spatial distribution of energy may also depend on the type of laser. A smooth spatial distribution of energy may be provided in an excimer laser, for example, by adjusting the illumination section. A smooth spatial distribution of energy may be provided in a DPSS or fiber laser, for example, by defocusing or beam shaping through diffractive and/or transmissive optics, Other embodiments of the beam delivery system 120 may include other combinations of one or more optical components, such as masks, lenses, and reflectors, to modify the raw laser beam 112 and produce the modified laser beam 122 used for lift off as described herein.

The workpiece stage 130 may include a workpiece holder for holding the workpiece 102 and a motion stage for moving the workpiece 102. The workpiece holder may include a clamp (not shown) for mechanically clamping the workpiece 102 during the lift off process and then slowly releasing the workpiece 102 after the entire workpiece 102 has been exposed to the laser. Clamping the workpiece 102 prevents releasing the layers 104, 106 until after the laser exposure, which may be advantageous, particularly on larger workpieces, to control stresses near the lift off front where the layers 104, 106 are separating.

Motion stages may include an X-Y and/or theta positioning stage capable of moving the workpiece 102 in an X-Y direction and/or rotating the workpiece 102. The motion control system 132 may include a programmable controller including hardware and software for controlling both the laser irradiations and the positioning of the workpiece 102. In one example, the motion control system 132 controls the laser irradiations synchronized with the motion of the workpiece using a "fire on the fly" technique to provide stepwise movement of the workpiece in between successive pulses of laser irradiation with the desired overlap.

Figure 2:
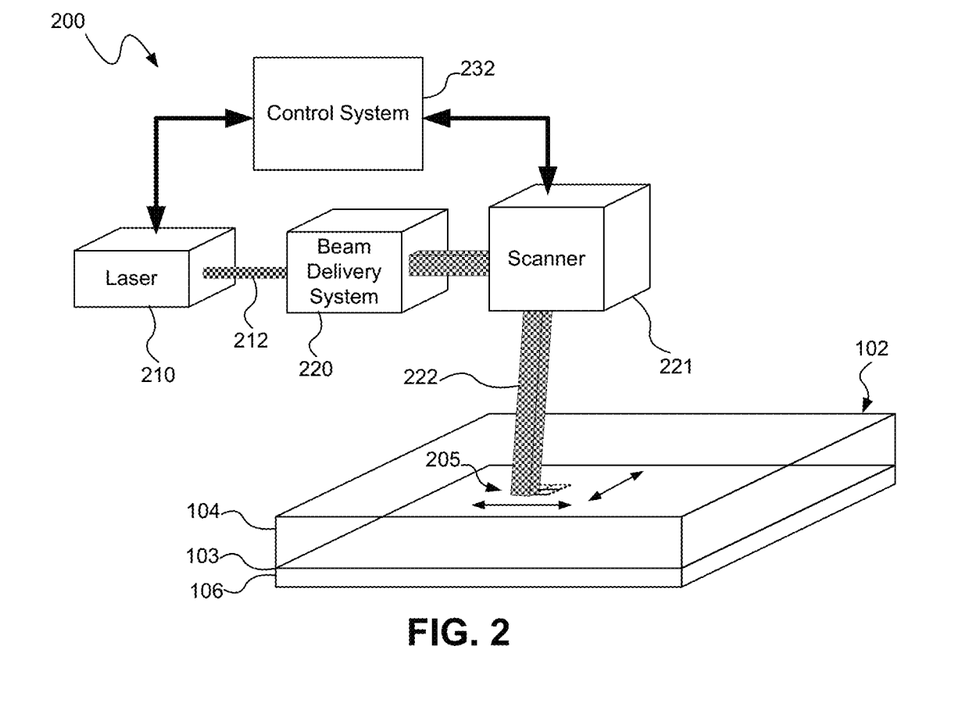
FIG. 2 is a schematic perspective view of a laser lift off system capable of moving a laser beam to overlap irradiation zones and provide multiple pulses of laser irradiation per location, consistent with embodiments of the present disclosure.

Referring to FIG. 2, another embodiment of a laser lift off system 200 is capable of moving a modified laser beam 222 to overlap the irradiation zones and provide multiple pulses of laser irradiation per location. The laser lift off system 200 generally includes a laser source 210 for generating a raw laser beam 212 and a beam delivery system 220 for modifying the raw laser beam 212 and directing a modified laser beam 222 to the interface 103 between the layers 104, 106. In this embodiment, the laser lift off system 200 also includes a scanner 221 for scanning the modified laser beam 222 on the workpiece 102 to overlap the irradiation zones. A control system 232 is coupled to the laser source 210 and to the scanner 221 to control the laser irradiations and the motion of the modified laser beam 222 relative to the workpiece 102 such that the laser irradiation zones overlap to provide multiple pulses of laser irradiation per location.

The laser source 210 and the beam delivery system 220 may be the same as described above in connection with the laser lift off system 100 in FIG. 1. As described above, the modified laser beam 222 may be a non-homogeneous laser beam with a smooth spatial distribution of energy. The scanner 221 may include a 1-D or 2-D galvanometer, a rotating polygon mirror, or other scanning devices known to those skilled in the art for scanning a laser beam. The scanner 221 may be used instead of or in addition to moving the workpiece 102 with a motion stage. Laser lift off systems may also move the laser beam in other ways, for example, by moving an optical head including the beam delivery system.

Both of the laser lift off systems 100, 200 described above are capable of providing stepwise relative movement between the workpiece 102 and the modified laser beam 122, 222 to overlap laser irradiation zones to provide multiple pulses of laser irradiation per location at the interface 103 between the layers 104, 106. Stepwise relative movement is provided by moving the workpiece 102 and/or the modified laser beam 122, 222 in steps in between the pulses of laser irradiation. Providing multiple pulses of laser irradiation per location at the interface between the layers 104, 106 may separate the layers while avoiding uneven exposures across the workpiece and preventing cracking as the layers are separated. The number of pulses of laser irradiation per location may be sufficient to cause separation of the layers 104, 106, for example, by ablation or debonding of at least one of the layers 104, 106 where the pulse is absorbed. In other embodiments, the lift off process of overlapping irradiation zones to provide multiple pulses of laser irradiation per location may be repeated one or more times to cause the separation.

FIGS. 3A-3E illustrate one example of irradiating overlapping laser irradiation zones 305 with a beam spot 324 such that locations 326 at the interface between layers to be separated are exposed to multiple pulses of laser irradiation and exposed to a different portion of the beam spot 324 for each of the multiple pulses of the laser irradiation. In the illustrated example, the stepwise relative movement (S) is about ½ the width of the beam spot 324, resulting in an overlap of the irradiation zones 305 by a pitch corresponding to about ½ the width of the beam spot 324. Although the illustrated example shows a square-shaped beam spot 324 with corresponding square-shaped irradiation zones 305, the actual beam spot may not be perfectly square shaped when the beam is non-homogeneous with a smooth spatial distribution of energy because the energy may decrease to zero toward the edges. Thus, a non-homogeneous beam with a smooth spatial distribution of energy may produce a generally square-shaped beam spot with rounded, undefined edges.

As shown respectively in FIGS. 3A-3D, four pulses of laser irradiation from the beam spot 324 may irradiate four overlapping irradiation zones 305-1 to 305-4 such that the location 326 at the intersection of the overlapping irradiation zones 305-1 to 305-4 is exposed to all four pulses of laser irradiation. The overlapping irradiation zones 305-1 to 305-4 are not necessarily irradiated in sequential order. The location 326 is also exposed to laser irradiation from a different portion of the beam spot 324 for each of the four pulses of laser irradiation, thereby providing self-homogenization as described in greater detail below. The energy of each pulse of laser irradiation may be set such that the four pulses at the location 326 are sufficient to separate the layers of material at this location 326 with minimal or no cracking. In one application separating an epi layer of GaN from sapphire, the energy density from a generally square shaped laser beam is in a range of about 500 to 1000 $mJ/cm^2$. The pulse energy will depend on the beam size. Thus, a larger beam spot (e.g., 250 microns to 5 mm) may be used with an excimer laser with higher pulse energy and smaller beam sizes (e.g., 10 microns to 250 microns) are generally used with a DPSS laser with lower pulse energy.

Figure 3A:
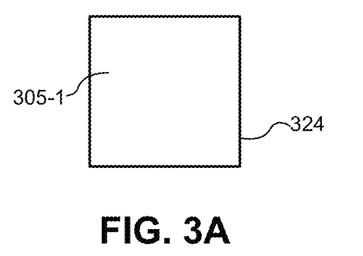
FIGS. 3A-3E illustrate overlapping irradiation zones formed by a generally square-shaped laser beam resulting in multiple pulses of laser irradiation per location, consistent with an embodiment of the present disclosure.
Figure 3B:
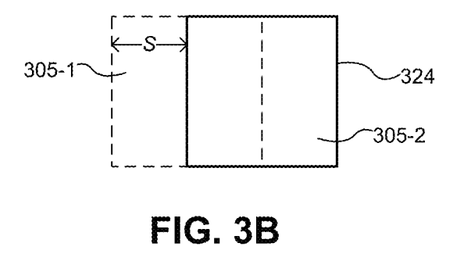
Figures 3C, 3D:
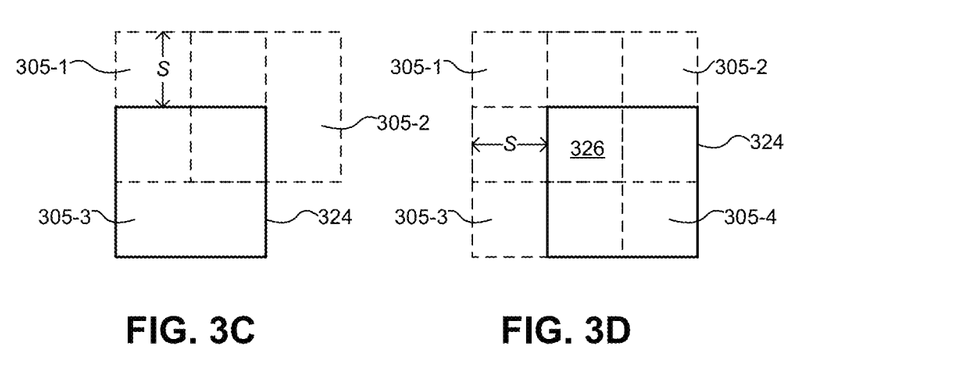
Figure 3E:
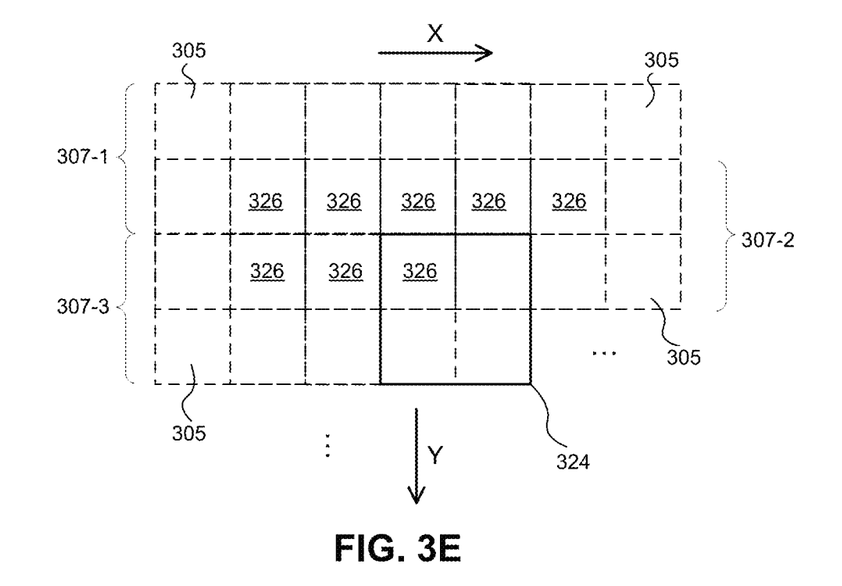
Figure 4A:
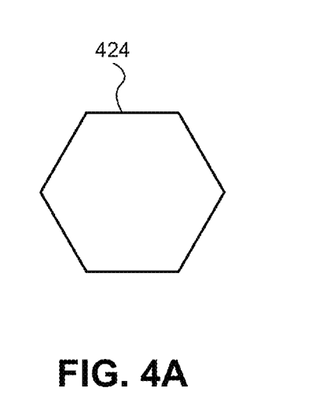
FIG. 4A-4D illustrate overlapping irradiation zones formed by a generally hexagonal-shaped laser beam resulting in multiple pulses of laser irradiation per location, consistent with an embodiment of the present disclosure.
Figure 4B:
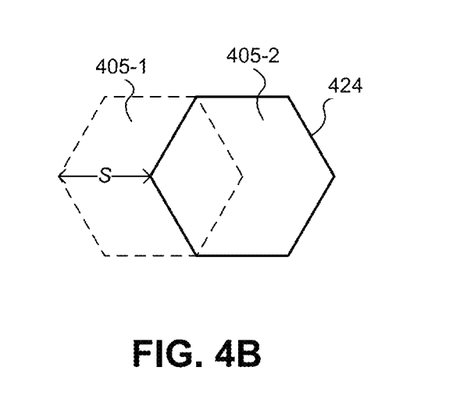
Figure 4C:
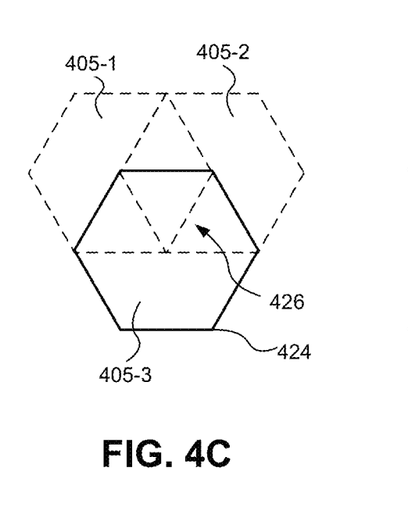
Figure 4D:
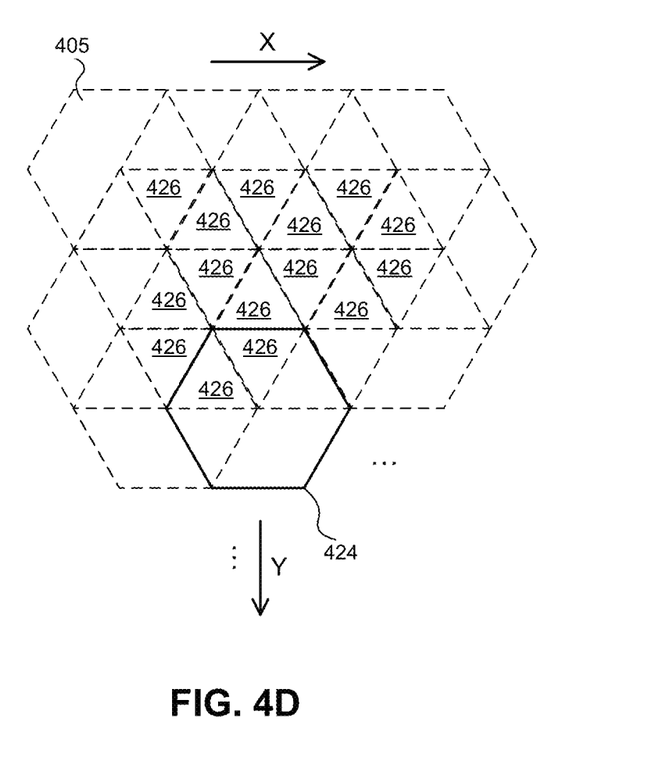

As a result of multiple pulses of laser irradiation using the beam spot 324 and the stepwise relative movement (S) of ½ the width of the beam spot 324, as shown in FIG. 3E, multiple contiguous locations 326 may be exposed to the multiple pulses of laser irradiation (i.e., 4 pulses per location) until the whole workpiece (e.g., the wafer) is exposed and separation occurs across the workpiece. The pulses of laser irradiation may irradiate laser irradiation zones 305 moving across the workpiece (e.g., the wafer) in any direction and using any pattern of laser irradiations provided that the irradiation zones 305 overlap in the manner described herein. As shown in the illustrated example, stepwise relative movement of the beam spot 324 may be in the X and Y directions to irradiate a first row 307-1 of laser irradiation zones 305, a second row 307-2 of laser irradiation zones 305, a third row 307-3 of laser irradiation zones 305, and so on. In other variations, the rows 307-1 to 307-3 may be shifted and offset relative to each other; for example, the second row 307-2 may be offset from the first and third rows 307-1, 307-3 by a step size of about ½ the width of the beam spot 324.

Although the illustrated embodiment shows laser irradiations overlapping the irradiations zones 305 consecutively, laser irradiations do not need to overlap consecutively as long as the irradiation zones 305 eventually overlap to provide multiple pulses of laser irradiation per location 326. In other words, the irradiation zones 305 may be irradiated non-consecutively using different patterns and using stepwise relative movement that is a multiple of ½ the beam width. In one example referring to FIG. 3E, the first row 307-1 may be irradiated, the third row 307-3 may be irradiated, and then the second row 307-2 may be irradiated. In another example, the first row 307-1 may be formed by one series of laser irradiations with a stepwise relative movement of one beam width and then an overlapping series of laser irradiations with the same stepwise relative movement of one beam width but shifted by ½ the beam width in the X direction. In another example, the laser irradiations my form spiral patterns to produce the overlapping irradiation zones with multiple pulses of laser irradiation per location 326. These variations of the patterns of laser irradiations may minimize stress resulting from the laser lift off front where the separation occurs. Thus, the laser lift of systems and methods described herein may minimize stress at the full wafer level in addition to minimizing local stress by using the non-homogenous beam with a smooth spatial distribution of energy. Other examples of patterns for laser lift off irradiations to minimize stress are described in greater detail in U.S. Patent Application Publication No. 2011/0132549, which is incorporated herein by reference.

The pulses of laser irradiation may be overlapped across the workpiece such that the locations 326 receiving multiple pulses of laser irradiation extend across the workpiece sufficiently to separate the layers, but it is not necessary for all areas to receive multiple pulses of laser irradiation. The locations 326 receiving the multiple pulses of laser irradiation may extend across at least a majority of the locations at the interface between the layers to be separated and preferably across substantially all locations at the interface. Providing a consistent number of exposures at these locations may avoid the problems caused by higher exposures in certain areas. Although the illustrated embodiment shows stepwise relative movement of exactly ½ the beam width forming contiguous locations 326 with the same number of pulses (i.e., 4 pulses), it is possible that the stepwise relative movement may not be exactly ½ the beam width and the locations 326 with the multiple pulses may not be perfectly contiguous, as long as the layers may be separated with minimal or no cracking.

FIGS. 4A-4D illustrate another example of irradiating overlapping laser irradiation zones 405 with a generally hexagonal shaped beam spot 424 such that locations 426 at the interface between layers to be separated are exposed to multiple pulses of laser irradiation and exposed to a different portion of the beam spot 424 for each of the multiple pulses of the laser irradiation. In this illustrated embodiment, the stepwise relative movement (S) is again about ½ the width of the beam spot 424 to overlap the irradiation zones with a pitch of about ½ the beam width. In this embodiment, however, three pulses of laser irradiation from the generally hexagonal shaped beam spot 424 may irradiate three overlapping irradiation zones 405-1 to 405-3 such that the location 426 at the intersection of the overlapping irradiation zones 405-1 to 405-4 is exposed to all three pulses of laser irradiation. Similar to the generally square shaped beam spot, the overlapping of the laser irradiation zones 405-1 to 405-3 of the generally hexagonal shaped beam spot 424 from a non-homogenous laser beam produces a self-homogenization effect because the location 426 receives pulses of laser irradiation from three different portions of the non-homogeneous, generally hexagonal shaped beam spot 424. Although the illustrated example shows a perfectly hexagonal shaped beam spot 424 with corresponding hexagonal-shaped irradiation zones 405, the actual beam spot may not be perfectly hexagonal shaped when the beam is non-homogeneous with a smooth spatial distribution of energy.

FIGS. 5A-5H illustrate various examples of profiles of non-homogeneous laser beams with a smooth spatial distribution of energy. In these examples, the energy of the beam gradually decreases to zero or close to zero at one or more of the edges of the beam to avoid sharply defined beam edges. Avoiding sharply defined beam edges may be advantageous in certain applications, for example, by preventing cracking caused by sharp pressure gradients. The smooth spatial distribution of the energy on the laser irradiation zone exposed by a non-homogenous modified laser beam may also facilitate the lift off process depending on the wafer type. In particular, the smooth spatial distribution of energy that gradually reduces to zero or close to zero at one or more edges may reduce stresses proximate the lift off front as the lift off process progresses across a wafer. Separation of the layers may also be facilitated because the local ablation rate, plume pressure, and temperature vary under the non-homogenous modified laser beams due to the variation of the energy density and peak intensity.

Figure 5A:
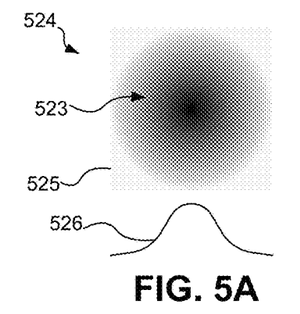
FIGS. 5A-5H illustrate examples of profiles of non-homogeneous laser beams having smooth spatial distributions of energy, consistent with embodiments of the present disclosure.
Figure 5B:
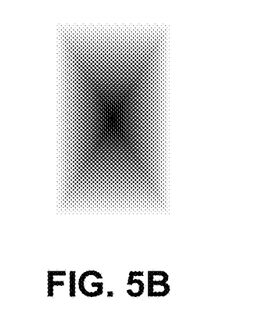
Figure 5C:
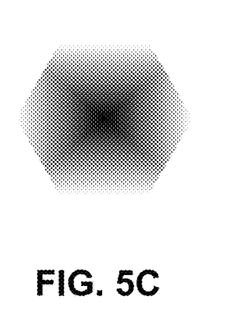
Figure 5D:
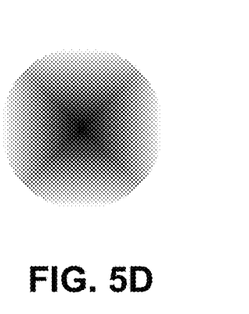
Figure 5E:
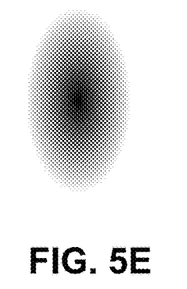

As shown in FIG. 5A, one example of a non-homogeneous laser beam has a smooth spatial distribution of energy that gradually decreases from a central region 423 of the beam spot 424 toward edges 425 of the beam spot 424 forming a Gaussian profile 426. The beam spot 424 is generally square-shaped but appears rounded or circular because the energy decreases gradually to zero or almost zero moving from the central region 423 to the edges 425.

Figure 5F:
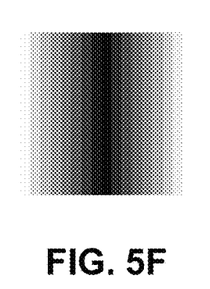
Figure 5G:
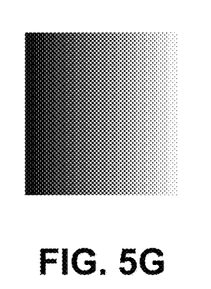
Figure 5H:
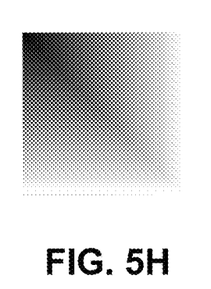

As shown in FIGS. 5B-5E, non-homogeneous laser beams may also have other smooth spatial distributions of energy and other shapes, such as rectangular, hexagonal, circular, and elliptical. Referring to FIGS. 5F-5H, non-homogeneous laser beams may have a smooth spatial distribution of energy that decreases from a location other than the center of the beam and/or toward less than all of the edges of the beam.

In other embodiments, a laser lift off system and method that overlaps irradiation zones to provide multiple pulses of irradiation per location may also use, for some applications, a modified laser beam with a uniform spatial distribution of energy with sharply defined edges (e.g., a beam with a flat or top hat profile). In some of these embodiments, one of the layers of material may be used to create a smoother spatial distribution of energy as the beam passes through the material. A sharply defined beam may be used, for example, with a workpiece including unpolished sapphire as the layer through which the laser beam passes. The unpolished sapphire thus acts as the driver to create a smoother sidewall profile of the modified beam as the beam passes through the unpolished sapphire. The characteristics of the sapphire may also be changed (e.g., by machining or patterning the sapphire) in such a way as to diffuse the beam that reaches the epi layer.

Figure 6A:
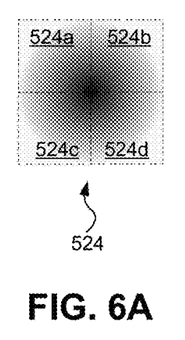
FIG. 6A-6C illustrate a self-homogenization effect resulting from multiple pulses of laser irradiation per location produced by a generally square-shaped, non-homogeneous laser beam on overlapping irradiation zones, consistent with an embodiment of the present disclosure.
Figure 6B:
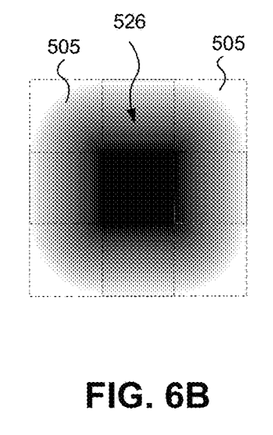
Figure 6C:
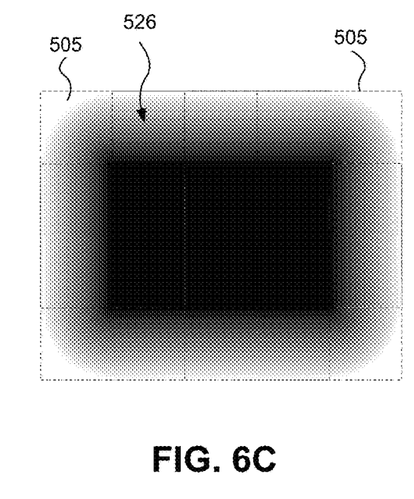

FIGS. 6A-6C further illustrate the self-homogenization effect when a beam spot 524 from a non-homogeneous laser beam is overlapped as described above. As a result of the overlap with a pitch of about ½ the beam width, different portions or regions of the beam (e.g., the quadrants 524a-524d) irradiate each of the locations 526 receiving the multiple pulses of laser irradiation. Because each of the locations 526 receives multiple pulses (e.g., four pulses) of laser irradiation from different portions (e.g., the quadrants 524a-524d) of the beam spot 524 from a non-homogeneous laser beam, the total exposure to laser irradiation at these locations 526 is an average of the entire beam spot 524. The overlapping of the irradiations from the non-homogeneous beam spot 524 thus globally integrates the non-homogeneous beam and produces a self-homogenizing effect at the location 526. FIG. 6B shows four irradiation zones forming the location 526 that receives four pulses of laser irradiation from each of the four different quadrants 524a-524d of the beam spot 524. FIG. 6C shows twelve irradiation zones forming several locations 526 each receiving four pulses of laser irradiation from each of the four different quadrants 524a-524d of the beam spot 524, thereby providing a similar, globally-integrated exposure across all of the locations 526. Using a non-homogeneous beam with a self-homogenization effect may significantly increase the process window or optimum range of laser energies for performing lift off.

The size of the modified laser beam and the beam spot may depend on the pulse energy and the application. For laser lift off systems using excimer lasers, a higher pulse energy allows larger laser beams, for example, a square shaped beam that is 1 mm by 1 mm or larger. For laser lift off systems using DPSS lasers, the limited pulse energy may require smaller laser beams, for example, a square shaped beam that is less than 1 mm by 1 mm and more specifically about 50 microns by 50 microns or less.

The size of the modified laser beam used in the lift off methods described herein may also provide advantages for certain applications. When lifting an epi layer off of sapphire, for example, a large non-homogeneous beam (e.g., 1 mm by 1 mm or greater) can minimize the effect of weld back of the sapphire. This may be a result of the pressure and temperature differential helping with detachment and minimizing melting at edges of the beam spot. Larger beam sizes may also be advantageous for brittle materials.

For some applications, a larger non-homogeneous beam with a smooth spatial distribution of energy may also control cracking along the edges of the laser exposure. When using an excimer laser, for example, a larger beam may be 1 mm by 1 mm beam (as compared to a smaller 250 by 250 micron excimer laser beam). When using a DPSS laser, a larger beam may be a beam with a 100 micron diameter (as compared to a smaller 25 micron diameter DPSS laser beam).

For patterned sapphire applications, a smaller non-homogeneous laser beam (e.g., about 50 microns by 50 microns or less) from a DPSS laser may be used with an out-of-focus technique to provide effective lift off. The out-of-focus technique involves focusing the non-homogeneous beam above the patterned sapphire substrate as described above. By intentionally defocusing the beam, the angle of incidence of the beam reaching the epi layer may be varied to optimize the laser lift off process.

The temporal profile of the pulse of laser irradiation may also minimize stress and crack formation. A shorter beam of 1 ns or less at 248 nm or 266 nm, for example, may result in less optical and thermal penetration depth, thus allowing for better overall yield. The wavelength of the laser may also be adjusted to control the depth of affectation, thereby dictating overall plume pressure. A 193 nm laser, for example, may provide better results than a 248 nm laser with a smoother epi surface for some applications.

Accordingly, the laser lift off systems and methods, consistent with embodiments described herein, overlap laser irradiation zones to provide multiple pulses of laser irradiation per location. Providing multiple pulses of laser irradiation per location allows layers to be separated while avoiding regions of excessive exposure and pressure and thus minimizing damage to the epi layers and resulting semiconductor devices. Using a non-homogeneous beam and an overlap that provides self-homogenization may also be advantageous by increasing the laser lift off process window.

Consistent with one embodiment, a laser lift off method is provided for separating layers of material. The method includes: providing a workpiece including at least first and second layers of material; generating pulses of laser irradiation by a non-homogenous laser beam with a smooth spatial distribution of energy; directing the laser beam through one of the first and second layers of material to an interface of the first and second layers of material such that a beam spot is formed by the at least one non-homogenous laser beam at the interface; and moving at least one of the non-homogenous laser beam and the workpiece in a stepwise manner such that the pulses of the laser irradiation irradiate overlapping irradiation zones corresponding to the beam spots formed at the interface between the first and second layers, wherein the irradiation zones are overlapped such that locations at the interface are exposed to multiple pulses of the laser irradiation, wherein each of the locations at the interface is exposed to a different portion of the beam spot for each of the multiple pulses of the laser irradiation to provide self-homogenization across the interface, and wherein the multiple pulses of the laser irradiation at the locations are sufficient to cause separation of the layers.

Consistent with another embodiment, a laser lift off method is provided for separating layers of material. The method includes: providing a workpiece including at least first and second layers of material; generating pulses of laser irradiation by a laser beam; directing the laser beam through one of the first and second layers of material to an interface of the first and second layers of material such that a beam spot is formed by the at least one laser beam at the interface; and moving at least one of the laser beam and the workpiece in a stepwise manner such that the pulses of the laser irradiation irradiate overlapping irradiation zones corresponding to the beam spots formed at the interface between the first and second layers, wherein the irradiation zones are overlapped with a step size of about ½ a width of the beam spot such that locations at the interface are exposed to multiple pulses of the laser irradiation, wherein each of the locations at the interface is exposed to a different portion of the beam spot for each of the multiple pulses of the laser irradiation, and wherein the multiple pulses of the laser irradiation at the locations are sufficient to cause separation of the layers.

Consistent with yet another embodiment, a laser lift off system includes a workpiece stage for supporting a workpiece including at least first and second layers of material and a laser for generating pulses of laser irradiation by a laser beam. A beam delivery system is configured to modify the laser beam to produce a non-homogeneous laser beam with a smooth spatial distribution of energy and to direct the laser beam through one of the first and second layers of material to an interface of the first and second layers of material such that a beam spot is formed by the at least one laser beam at the interface. A control system is configured to control movement of at least one of the laser beam and the workpiece in a stepwise manner such that the pulses of the laser irradiation irradiate overlapping irradiation zones corresponding to the beam spots formed at the interface between the first and second layers. The irradiation zones are overlapped such that locations at the interface are exposed to multiple pulses of the laser irradiation. Each of the locations is exposed to a different portion of the beam spot for each of the multiple pulses of the laser irradiation to provide self-homogenization across the interface. The multiple pulses of the laser irradiation at the locations are sufficient to cause separation of the layers.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A laser lift off method for separating layers of material, the method comprising:
   providing a workpiece including at least first and second layers of material;
   generating pulses of laser irradiation by a non-homogenous laser beam with a smooth spatial distribution of energy;
   directing the laser beam through one of the first and second layers of material to an interface of the first and second layers of material such that a beam spot is formed by the at least one non-homogenous laser beam at the interface; and
   moving at least one of the non-homogenous laser beam and the workpiece in a stepwise manner such that the pulses of the laser irradiation irradiate overlapping irradiation zones corresponding to the beam spots formed at the interface between the first and second layers, wherein the irradiation zones are overlapped such that locations at the interface are exposed to multiple pulses of the laser irradiation, wherein each of the locations at the interface is exposed to a different portion of the beam spot for each of the multiple pulses of the laser irradiation to provide self-homogenization across the interface, and wherein the multiple pulses of the laser irradiation at the locations are sufficient to cause separation of the layers.

2. The laser lift off method of claim 1 wherein the irradiation zones are overlapped with a pitch of ½ a width of the beam spot.

3. The laser lift off method of claim 2 wherein the beam spot and irradiation zones are generally square shaped, and wherein each of the locations at the interface is exposed to four pulses of laser irradiation.

4. The laser lift off method of claim 2 wherein the beam spot and irradiation zones are generally hexagonal shaped, and wherein each of the locations at the interface is exposed to three pulses of laser irradiation.

5. The laser lift off method of claim 1 wherein the pulses of the laser irradiation irradiate overlapping irradiation zones non-consecutively.

6. The laser lift off method of claim 1 wherein the workpiece is moved in the stepwise manner between the irradiations.

7. The laser lift off method of claim 1 wherein the non-homogenous laser beam is moved in the stepwise manner in between the irradiations.

8. The laser lift off method of claim 1 wherein the smooth spatial distribution of energy forms a Gaussian profile.

9. The laser lift off method of claim 1 wherein the beam spot is larger than 1 $mm^2$.

10. The laser lift off method of claim 1 wherein the laser beam is generated from an excimer laser.

11. The laser lift off method of claim 1 wherein the laser beam is generated from a diode pumped solid state (DPSS) laser.

12. The laser lift off method of claim 1 wherein the laser beam is generated from a fiber laser.

13. The laser lift off method of claim 1 wherein the pulses are less than 200 ns.

14. The laser lift off method of claim 1 wherein the first and second layers include a substrate and at least one film formed on the substrate.

15. The laser lift off method of claim 14 wherein the substrate is a sapphire substrate, and wherein the at least one film is a GaN film.

16. The laser lift off method of claim 1 wherein generating the pulses of laser irradiation includes shaping the laser beam and modifying the laser beam such that the non-homogeneous laser beam has smooth spatial distribution of energy gradually decreasing from a central region of the beam toward edges of the beam.

17. The laser lift off method of claim 1 wherein generating pulses of laser irradiation includes generating an ultrashort pulse laser beam having a pulse duration less than 1 nanosecond using an ultrafast laser.

18. A laser lift off method for separating layers of material, the method comprising:
   providing a workpiece including at least first and second layers of material;
   generating pulses of laser irradiation by a laser beam;
   directing the laser beam through one of the first and second layers of material to an interface of the first and second layers of material such that a beam spot is formed by the at least one laser beam at the interface; and
   moving at least one of the laser beam and the workpiece in a stepwise manner such that the pulses of the laser irradiation irradiate overlapping irradiation zones corresponding to the beam spots formed at the interface between the first and second layers, wherein the irradiation zones are overlapped with a pitch of ½ a width of the beam spot such that locations at the interface are exposed to multiple pulses of the laser irradiation, wherein each of the locations at the interface is exposed to a different portion of the beam spot for each of the multiple pulses of the laser irradiation, and wherein the multiple pulses of the laser irradiation at the locations are sufficient to cause separation of the layers.

19. The laser lift off method of claim 18 wherein the laser beam has feathered edges.

20. The laser lift off method of claim 18 wherein the laser beam is non-homogenous.

21. The laser lift off method of claim 18 wherein the laser beam is larger than 1 mm$^2$.

22. The laser lift off method of claim 18 wherein one of the layers of material is unpolished sapphire, and wherein the laser beam is directed through the unpolished sapphire.

* * * * *